July 28, 1925.  1,547,832

A. SMITH

ATTACHMENT FOR DRIVING SCRAPERS AHEAD OF TRACTORS

Filed Sept. 15, 1924

Witness:
Inventor
Albert Smith
By Hazard & Miller
Attorneys

Patented July 28, 1925.

1,547,832

UNITED STATES PATENT OFFICE.

ALBERT SMITH, OF SAWTELLE, CALIFORNIA.

ATTACHMENT FOR DRIVING SCRAPERS AHEAD OF TRACTORS.

Application filed September 15, 1924. Serial No. 737,794.

*To all whom it may concern:*

Be it known that I, ALBERT SMITH, a citizen of the United States, residing at Sawtelle, in the county of Los Angeles and State of California, have invented new and useful Improvements in Attachments for Driving Scrapers Ahead of Tractors, of which the following is a specification.

This invention relates to improvements in scrapers which are used in connection with moving earth, such as in grading roadways, and similar construction.

It is an object of this invention to provide an attachment for a scraper, which scraper is in the form of what is commonly known as the Fresno scraper, so that it may be pushed ahead of a tractor or equivalent vehicle.

It is a further object of this invention to provide an attachment for a scraper which will enable it to be pushed ahead of a tractor, and to provide means for causing the scraper to be dumped, which means is operable from the driver's seat of the tractor.

Figure 1:
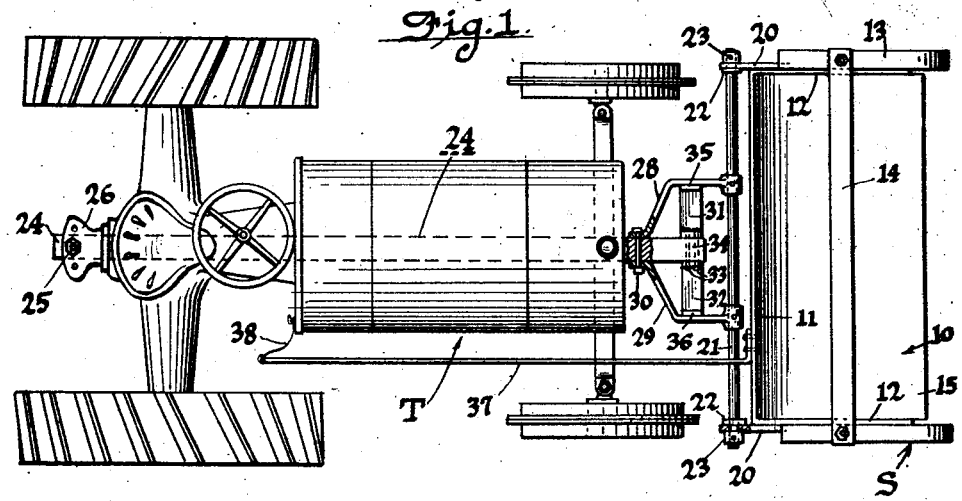
Figure 2:
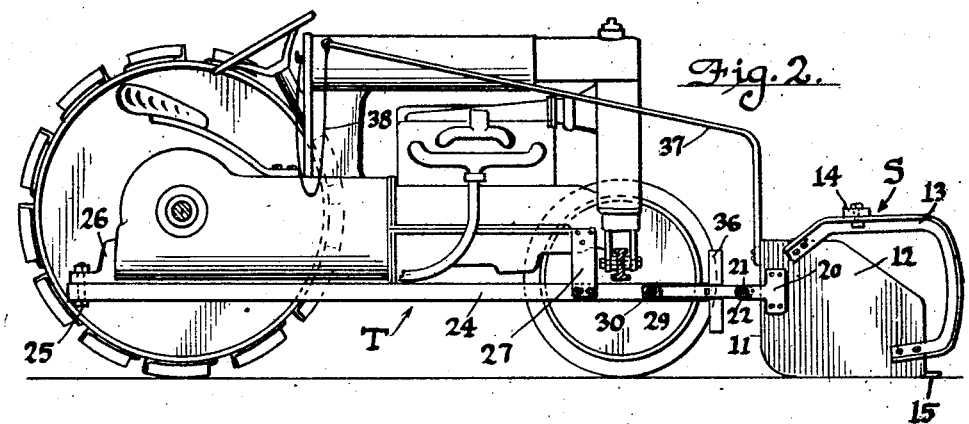
Figure 3:
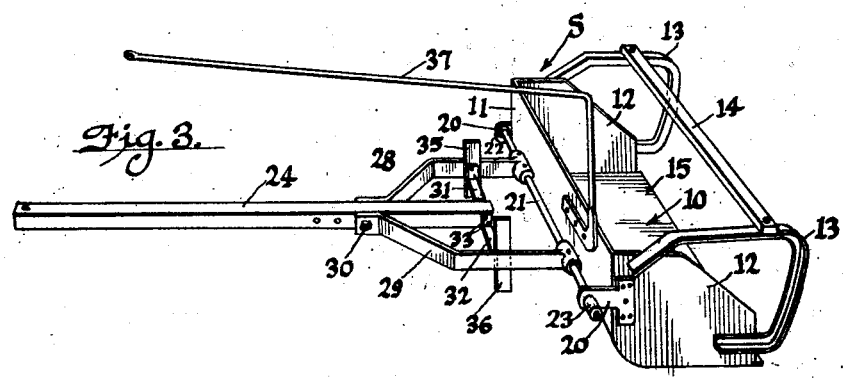

With the foregoing and other objects in view which will be made manifest in the following detailed description and pointed out in the appended claims, reference is had to the accompanying drawings for an illustrative embodiment of the invention, wherein:

Figure 1 is a top plan view of a tractor and scraper to which the improved attachment has been applied, Fig. 2 is a side elevation of the tractor and scraper shown in Fig. 1, parts of the tractor being shown as removed, and Fig. 3 is a perspective view of the scraper with the attachment provided thereon.

Referring to the accompanying drawings wherein similar reference characters designate similar parts throughout, the tractor T which may be of any known make or of any conventional construction, is shown as having a scraper S disposed forwardly thereof.

The scraper S is of conventional construction having a bottom 10, rear wall 11, side walls 12 and runners or slides 13 mounted thereon, which runners may be joined by a bar 14. The forward end of the bottom 10 extends forwardly of the sides 12, constituting a blade 15. The scraper S is in construction the same as the ordinary scraper used in grading which is commonly known as the Fresno scraper. In order that the scraper may be pushed ahead of the tractor T, a pair of brackets 20 are mounted as by rivets, or their equivalent, upon the sides 12 of the scraper, and a spindle 21 has its ends journaled in the brackets 20. Suitable shoulders 22 may be formed upon the ends of the spindle 21, so as to engage the brackets 20, and collars 23 or other suitable fastening devices, such as pins, may be placed upon the ends of the spindle 21 so as to hold the spindle together with the brackets 20. In the present embodiment of the invention, the bar 24 has a bolt 25 extending therethrough and through a draw lug 26 of the tractor. Suitable brackets 27 may be mounted upon the forward end of the tractor so as to form an additional securing means for the bar 24. Arms 28 and 29 are rigidly secured upon the spindle 21 and are pivotally mounted, as by a bolt 30, upon the bar 24. A pair of horizontal members 31 and 32 may be secured, as by bolts 33, to the forward end of the bar 24, and vertical guides 35 and 36 are rigidly secured to the ends of the members 31 and 32 respectively. The vertical guides 35 and 36 bear upon the opposed faces of the arms 28 and 29 so as to prevent lateral movement of the arms and scraper with respect to the bar 24. A suitable handle 37 is secured upon the back 11 of the scraper S. This handle extends upwardly and rearwardly to a position adjacent the driver's seat upon the tractor. A flexible element 38 is secured upon the end of the handle 37 and may be adjustably tied or otherwise fastened upon the body of the tractor T.

The operation of the device is as follows: The tractor T may be driven forward and earth may be picked up within the scraper S as is ordinarily done when the scraper is pulled by horses or mules. When it is desired to dump the scraper, the handle 37 is lifted upwardly by the driver of the tractor, causing the blade 15 to dig into the ground. As the blade 15 digs into the ground, forward movement of the tractor T will cause the scraper S to swing upwardly and over onto the runners or slides 13. The flexible element 38 limits the upward movement of the handle 37 and thus prevents the scraper S from being turned completely over. After the scraper has been dumped, a rearward movement by the tractor will cause the scraper S to right itself and assume normal position. By providing two separate points of pivotal movement between the scraper S and the bar 24, the scraper may be moved vertically and still maintain the bottom 10 of the scraper in horizontal position.

The advantages of driving a scraper ahead of the tractor are readily apparent. The driver of the tractor can at all times see what is actually going on at the scraper, and also how much of a load the scraper is carrying. As has heretofore been experienced when the scraper is pulled by the tractor, the driver in order to watch the scraper has to be continually turning his head. Consequently, when the driver is watching the direction in which he is driving the tractor, the scraper S frequently gouges out earth from beneath the desired surface. Another advantage of pushing the scraper ahead of the tractor is in filling earth fills, such as ditches or the like. Where the scraper is drawn by the tractor T, the tractor cannot be driven across the ditch or into the fill, so as to dump the scraper directly into the fill. The same is also true where the scraper is drawn by horses. With the scraper S mounted in front of the tractor T, the tractor may be driven up to the edge of the earth fill and the scraper S dumped directly therein, after which the tractor T may be moved backwardly so as to pick up another load.

From the above it is seen that a substantial improvement has been made in connection with earth scrapers which enables them to be used in a much more advantageous manner than heretofore employed.

It will be understood that various changes may be made in the detail of construction without departing from the spirit or scope of the invention as defined by the appended claims.

I claim:

1. In combination with a scraper of the class described, brackets secured to the body of the scraper, a spindle journaled in said brackets, a bar, and arms secured to said spindle and pivotally secured to said bar, said bar being adapted to be secured to a tractor so that the scraper may be pushed ahead of the tractor.

2. In combination with a scraper of the class described, brackets secured to the body of the scraper, a spindle journaled in said brackets, a bar, arms secured to said spindle and pivotally secured to said bar, said bar being adapted to be secured to a tractor so that the scraper may be pushed ahead of the tractor, and means for causing said scraper to be dumped, said means being operable from the driver's seat upon the tractor.

3. In combination with a scraper of the class described, a spindle pivotally secured to said scraper, a bar adapted to be secured to a tractor so that the scraper may be pushed ahead of said tractor, arms secured upon said spindle and pivotally secured upon said bar, and vertical guides carried by said bar and engageable upon said arms for preventing their lateral movement.

4. In combination with a scraper of the class described, a bar adapted to be secured to a tractor so as to push the scraper ahead of the tractor, arms pivoted to said bar and to the scraper, and guides carried by said bar engageable upon said arms for preventing their lateral movement.

5. In combination with a scraper of the class described, a bar adapted to be secured to a tractor so as to push the scraper ahead of the tractor, arms pivoted to said bar and to the scraper whereby said scraper may move vertically or become tilted, and means for tilting said scraper in either direction, said means being operable from the driver's seat of the tractor.

6. In combination with a scraper of the class described, a bar adapted to be secured to a tractor so as to push the scraper ahead of the tractor, arms pivoted to said bar and to the scraper whereby said scraper may move vertically or become tilted, means for tilting said scraper, said means being operable from the driver's seat of the tractor, and means for limiting the tilting movement of said scraper.

7. In combination with a tractor, a member secured to the tractor, a pair of arms pivoted to said member and extending forwardly from the tractor, a scraper pivoted to said arms, and a rigid handle secured to the scraper and extending rearwardly to a point adjacent the driver's seat of the tractor, whereby the inclination of the bottom of the scraper may be controlled by the driver of the tractor.

8. In combination with a tractor, a scraper disposed forwardly of the tractor, means pivoted to the scraper and to the tractor for securing the scraper forwardly of the tractor, and means for controlling the inclination of the scraper from the driver's seat of the tractor.

In testimony whereof I have signed my name to this specification.

ALBERT SMITH.